(12) United States Patent
Zocchi et al.

(10) Patent No.: US 7,046,531 B2
(45) Date of Patent: May 16, 2006

(54) TRANSFORMERLESS STATIC VOLTAGE INVERTER FOR BATTERY SYSTEMS

(75) Inventors: Andrea Zocchi, Florence (IT); Placido M. Spaziante, Bangkok (TH); Krisada Kampanatsanyakorn, Bangkok (TH)

(73) Assignee: Squirrel Holdings Ltd., (KY)

( * ) Notice: Subject to any disclaimer, the term of this patent is extended or adjusted under 35 U.S.C. 154(b) by 177 days.

(21) Appl. No.: 10/754,575

(22) Filed: Jan. 12, 2004

(65) Prior Publication Data

US 2005/0007797 A1  Jan. 13, 2005

(51) Int. Cl.
*H02M 7/00* (2006.01)

(52) U.S. Cl. ....................................... 363/65

(58) Field of Classification Search .................. 363/65, 363/71; 320/118–122, 124, 135, DIG. 27; 439/123, 125, 142, 146, 149, 150, 152, 158, 439/160
See application file for complete search history.

(56) References Cited

U.S. PATENT DOCUMENTS

| | | | |
|---|---|---|---|
| 3,100,851 A | | 8/1963 | Ross et al. |
| 4,680,690 A | | 7/1987 | Dickerson |
| 5,097,184 A | * | 3/1992 | Echtler et al. ............. 318/139 |
| 5,959,370 A | * | 9/1999 | Pardo .......................... 307/77 |
| 6,388,426 B1 | * | 5/2002 | Yokoo et al. ............... 320/136 |
| 2004/0027092 A1 | * | 2/2004 | Patel et al. ................. 320/119 |

FOREIGN PATENT DOCUMENTS

| | | |
|---|---|---|
| GB | 2 015 834 | 9/1979 |
| JP | 2000341964 | 12/2000 |

* cited by examiner

*Primary Examiner*—Matthew V. Nguyen
(74) *Attorney, Agent, or Firm*—Connolly, Bove, Lodge & Hutz LLP

(57) ABSTRACT

A static inverter for a battery of elementary, current sources or cells electrically in series and a number N of intermediate voltage taps along the chain of elementary DC current sources, wherein the number of elementary cells comprised between an intermediate tap and another intermediate tap adjacent to it or an end terminal of said chain is proportionate to the amplitude in the respective phase interval of a number N of discretization phases of the waveform of the AC voltage to be output in a quadrant; is implemented by arranging for: a number N of power switches each connecting a respective intermediate tap and a first end terminal of a first polarity of said chain of elementary cells in series to a common circuit node of said first polarity; an output bridge stage constituted by at least four power switches controlled in pairs for switching the current paths through the bridge stage, having a first pair of nodes coupled to said common circuit node of said first plurality and to the other end terminal of polarity opposite to said first polarity of said chain of elementary cells, respectively, and a second pair of nodes constituting an AC output; and a control circuit sequentially and cyclically turning on, in a continuous manner, one switch at the time of said N switches; each for a phase interval of 1/(4N) times the period of said AC output, and alternately tuning on by pairs said four power switches of said output bridge stage at every half a period.

10 Claims, 7 Drawing Sheets

SELF-TRANSFORMER FOR DC CURRENTS

SELF-TRANSFORMER FOR AC CURRENTS

TRANSFORMER FOR DC CURRENTS

TRANSFORMER FOR AC CURRENTS

TRANSFORMERLESS STATIC VOLTAGE INVERTER FOR BATTERY SYSTEMS

BACKGROUND OF THE INVENTION

The present invention relates to systems for energy storage in batteries or for generating energy in fuel cells batteries employing static voltage inverters for converting electric energy stored or generated in batteries from DC to AC when powering electrical loads.

Static voltage inverters for transforming DC electric power in an AC electric power at a certain voltage (for example 240 VAC) are commonly used in renewable power source plants, in "load-leveling" plants, in electric vehicles and the like, using storage batteries or primary batteries of fuel cells for generating energy to power AC loads.

The possibility of converting the DC voltage of batteries of elementary cells, whether they are storage or secondary cells or primary cells such as fuel cells, to an AC voltage of voltage and frequency substantially similar to those of standard power distribution grids, is an important requisite for obvious compatibility reasons and often absolutely necessary in the case of emergency plants (UPS) that must intervene to maintain essential services in function in case of blackouts, and more generally for "grid connectable" systems.

The functional diagram of a system of rechargeable storage batteries is shown in FIG. 1, that in the example shown are vanadium redox flow batteries.

As will be obvious to any skilled person, the inverter depicted in the diagram of FIG. 1 will be the same from a functional point of view whether the DC source is a storage battery of any kind or alternatively a battery of fuel cells.

The use of storage batteries is practically absolutely necessary in stand alone photovoltaic (solar) panels systems not connected to any power distribution grid. Redox flow batteries are much more convenient than other types of storage batteries. Among redox flow batteries, all vanadium batteries, i.e. batteries that employ a vanadium-vanadium redox couple in the negative electrolyte as well as in the positive electrolyte, are particularly advantageous.

Performances of a storage plant employing vanadium redox flow batteries are reported and analyzed in the article: "Evaluation of control maintaining electric power quality by use of rechargeable battery system", by Daiichi Kaisuda and Tetsuo Sasaki IEEE 2000.

There is a wealth of literature on redox flow batteries and in particular about vanadium redox flow batteries. Therefore, a detailed description of the peculiarities and advantages of such batteries in respect to other types of batteries does not seem necessary in order to fully describe the present invention.

Among many advantages of the redox flow batteries, it is worth remarking though their suitability to being charged even at different charging voltages. To accomplish this, intermediate taps of the electric chain, constituted by the elementary cells in electrical series that constitute the battery, may be used. Depending on the voltage of the available source, most appropriate taps are selected for coupling to the recharging voltage an appropriate number of cells. This is possible because, differently from other types of storage batteries, in redox flow battery systems energy is stored in the electrolytes that circulate through the cells and that are contained in two separated tanks. The battery represents exclusively the electrochemical device in which electric energy transforms in chemical energy and vice versa, and the electrodes do not undergo any chemical transformation during charge and discharge processes.

On the other hand, photovoltaic panels output an electric current when they are irradiated by a light source that may drive an electric load, however if a counter voltage exceeding a certain value is applied on the photovoltaic panel the output current becomes null.

The voltage-current characteristic of a photovoltaic panel has a typical "knee-shaped" curve, the zone enclosed between the curve and the x-axis (voltage) and the y-axis (current) represents the zone in which electric power may be extracted from the panel.

From the above considerations, it is evident that when the output voltage is close to the point of intersection between the voltage-current characteristic and the x-axis, the delivered power (represented by the area of the rectangle with its longest side parallel to the x-axis) becomes very small. Similarly, the available power becomes small also when the output voltage becomes very small.

In practice there is a value of output voltage, within the functioning zone of the characteristic, for which the area of the corresponding rectangle in the voltage-current domain is maximum, i.e. the panel outputs the maximum power that can be extracted.

Such maximum power value varies rapidly when irradiation conditions change. Indeed, the voltage-current characteristic of a solar panel changes in function of the irradiation parameter, practically generating voltage-current curves more or less concentric to each other, in function of the irradiation parameter.

Because this voltage-current characteristic of a photovoltaic panel, the maximum power that can be extracted from the photovoltaic panel varies rapidly with the varying of the conditions of irradiation.

Being obviously desirable to exploit to the fullest extent the available power for charging the storage battery or batteries, this is made possible in a very convenient manner by employing a redox flow battery provided with a plurality of intermediate voltage taps. In function of the current irradiation conditions, one terminal of the photovoltaic panel is automatically switched on the most appropriate intermediate voltage tap such that the battery voltage be as near as possible to the peak voltage of the voltage-current characteristic of the photovoltaic panel at the current irradiation conditions.

There are automatic switching devices that implement such a function, commonly known by the acronym MPPT, for Maximum Power Point Tracker, that optimize the charging conditions of the storage redox flow battery from photovoltaic panel current sources.

It is evident that such a system is much more convenient than using a DC-DC converter for absorbing energy from the photovoltaic panel, at a voltage most appropriate to the irradiation conditions and to boost or reduce it to a certain pre-established regulated output voltage suitable to charge the storage battery or batteries.

Even as far as delivering power to electric loads of different kind is concerned, redox flow batteries have the advantage of being able to support the delivering of current to a load, from a certain number of elementary cells and thus at a corresponding DC output voltage even several order of magnitude greater than the current being delivered by another group of cells, belonging the same battery or to a different battery, at the same output voltage or at a different output voltage, through distinct pairs of intermediate taps, by virtue of the above mentioned peculiar characteristics of redox flow batteries.

Therefore, a battery may be looked at, under certain functional terms, as an electric autotransformer or an electric transformer, wherein there are elementary cells electrically in series of coils and wherein chemical energy is in play instead of magnetic energy.

In view of the particular relevance that redox flow batteries have in many important applications, the ensuing description will refer to redox flow battery systems, notwithstanding the fact that the same considerations will hold even in the case in which batteries of different type are used instead of redox flow batteries, and in particular in the case of batteries of fuel cells.

The choice of the static voltage inverter strongly influences the overall energy conversion efficiency of the system when exploiting the energy storage or generation capacity of batteries of elementary cells.

Usually the efficiency of inverters ranges from a maximum of about 94% at full load and decreases progressively down to about 60% at low load levels.

As it is well known, static voltage inverters employ power switches, such as thyristors (SCR), bipolar junction transistors (BJT), insulated gate bipolar transistor (IGBT) or field effect transistors (MOS), functioning as static switches on DC networks, for realizing devices that switch periodically the connections between the supply rails and the load inverting the polarity. In this way the load is supplied with an alternating voltage, whose frequency depends from the switching frequency of the power switches. The alternating voltage is generally a square wave voltage, whose amplitude is substantially equal to the DC voltage of the voltage source constituted by the battery and by appropriate circuits and by adding output filters it is possible to obtain an almost sinusoidal output voltage.

There are many well known types of power inverters, each well discussed in the pertinent literature.

The "phase opposition inverter" and the "bridge inverter" are well known circuits commonly employing load inductors and/or transformers and turn off capacitors for coordinately and alternately turning off distinct power switches, commonly constituted by thyristors.

Inverters with a sinusoidal output are known, from which an output voltage wave approximating a sinusoid may be obtained. Such an inverter may be the same bridge inverter employing inductors or transformers is in series with a capacitor. By turning the equivalent load inductance and other eventual impedances in series with the capacitor for a desired output frequency, it is possible to produce an almost sinusoidal output wave.

When batteries are the electric energy sources, the regulation of an AC voltage output by the inverter must be realized by means of the same systems that are normally used for regulating AC voltages, such as sliding contact autotransformers, saturating core magnetic regulators and the like.

Independently from the type, the plant of energy storage or of generation in a plurality of elementary cells employs multicell batteries, i.e. batteries that are constituted by a great number of elementary cells electrically in series. Of course the plant may employ even a plurality of multicell batteries, electrically connected according to common series-parallel schemes, for ensuring the desired capacity of delivering electric power at a certain supply voltage.

When recharging storage batteries, the scheme of connection to the recharging DC source may be the same or more often is different from the scheme that is implemented during a discharge phase, and the different schemes may be implemented automatically by means of configuration switches and/or path selectors.

The driving in switched mode of the transformer, i.e. of the inductance of the circuit of a classic inverter, determines functioning conditions that are particularly burdensome for power switches, whether they are SCR, BJT or MOS. They must be precisely controlled to prevent failures. These functions are normally performed by appropriate turn on control and thermal protection circuits.

The transformer and/or the inductors commonly used in inverters dissipate power besides being relatively expensive because of peculiar features that often they must possess.

When to output a substantially sinusoidal waveform voltage is required, the cost of the inverter becomes considerably greater because of the greater complexity necessary for ensuring a precise and sufficiently constant frequency and eventually also for filtering the output voltage.

BRIEF SUMMARY OF THE INVENTION

It has now been found and is the object of the present invention a new method and a relative inverter that substantially does not require any inductor (or transformer) and turn-off capacitor and has an enhanced efficiency compared to known inverters. Moreover the inverter of this invention has a markedly reduced weight and is outstandingly suitable for converting a DC electric power, provided by a battery constituted by a considerable number of elementary cells electrically in series to AC electric power of a certain voltage whose waveform may be substantially sinusoidal the a frequency of which is precisely fixed by a control and drive circuit of a plurality of power switches.

Though remaining a valid alternative to the known inverters in many applications, the inverter of this invention is particularly suited to be employed in a redox flow battery system or in a battery system of primary fuel cells or of photovoltaic cells.

According to a first embodiment of the invention, the new method for producing electric power at a certain AC voltage and at a frequency exactly pre-established from a battery of elementary current sources electrically in series such as storage batteries, batteries of primary fuel cells and photovoltaic panels, comprises:

providing a plurality of DC current sources in the form of elementary cells electrically in series and establishing a plurality of N intermediate taps along the chain of elementary DC current sources such that the number of elementary cells comprised between a certain intermediate tap and another intermediate tap adjacent to it or a terminal of the electrical series is proportionate to the amplitude in the respective phase interval of an N number of discretization phases of the AC voltage waveform to be produced in a quadrant;

providing an N number of power switches, each connecting a respective intermediate tap and a first terminal of the electrical series of elementary cells to a common circuit node of a first polarity, coupling said common circuit node of first polarity and the other terminal of the electrical series of elementary cells of polarity opposed to said first polarity, to respective nodes of an output bridge stage constituted by at least four power switches controlled in pairs, the other two nodes of the bridge stage constituting the AC voltage power output;

switching sequentially and cyclically in a continuous manner one switch at the time of the N switches, each for a time interval corresponding to 1/(4N) times the period of the AC output voltage and switching the current paths through the bridge stage every half a period.

In practice the inverter of this invention does not use inductors nor capacitors to generate the desired AC waveform. It uses an array of power switches and an output bridge stage for switching the current paths (i.e. the polarity) controlled essentially by drive pulses derived from a clock signal.

In voltage terms, referred to the potential of a terminal of a certain polarity of the chain of elementary cells electrically in series, the N switches, upon their activation for a short interval of time corresponding to a phase of discretization, connect to the common node a sequentially and cyclically incremented and decremented number of elementary cells, thus producing a discretized voltage half-wave, that for example may be a sine wave, on the common circuit node. The inversion of polarity of the succession of half waves is carried out by switching the output paths through the output bridge stage at the expiration of each half a period of the frequency of the alternate waveform.

Only one of the N wires that constitute one output bus of a control and drive circuit of the array of N power switches is at any one instant in an active logic state, for example "I", while all the other N−1 wires are in an inactive logic state, for example "O". In operation, the active logic state switches sequentially and cyclically in a continuous manner from a wire to another, repeating in a continuous back and forth fashion the scheme of the N-phase switchings.

In practice, on the common node of the circuit whose voltage is referred to the potential of one terminal node of the electrical series of elementary cells, an uninterrupted sequence of half-waves, each produced by a complete back and forth cycle of phase switchings of the N wires of the control bus of the array of N power switches to an active logic state.

The same control and drive circuit has a second output bus of four wires, in case of a single output bridge for generating a monophase AC voltage, two wires of which are at any one instant in an active logic state and two wires in an inactive logic state. At every half-period of the established frequency of the output AC voltage, the logic state of the two pairs of control wires is inverted, thus switching the output current paths through the bridge stage and thus the polarity of the new half wave in respect to the polarity of the half wave that has just been completed.

In this way an output AC voltage, for example a substantially sinusoidal voltage of extremely low content of low-order harmonics and whose total harmonic content may be reduced by discretizing the sinusoid in a finer manner, i.e. by increasing the number N of intermediate taps and of the respective power switches, is efficiently constructed.

A peculiar synergism between the inverter of the present invention and a typical solar energy plant using photovoltaic panels and redox flow energy storage batteries should be remarked.

The same intermediate taps in the battery of elementary cells in series exploited for implementing the static inverter of the invention, may be used also by a so-called MPPT system as normally employed for exploiting in the best manner the power that may be provided by the photovoltaic panels, as will be explained in greater detail later.

In practice, by virtue of the possibility of establishing the number of elementary cells sequentially connectable to the output node for providing a sinusoidal voltage of a desired value, a battery-inverter assembly of the invention is able to output electric power at a pre-established AC voltage and frequency, independently of the load characteristics, using a DC source of relatively low voltage, such as the photovoltaic panels, without using transformers and/or inductors, with an outstandingly high efficiency of conversion of solar to AC electric power.

The various aspects and advantages of the invention will become even more evident through the ensuing description of significative embodiments and by referring to the attached drawings, wherein:

DETAILED DESCRIPTION OF THE INVENTION

Figure 1:
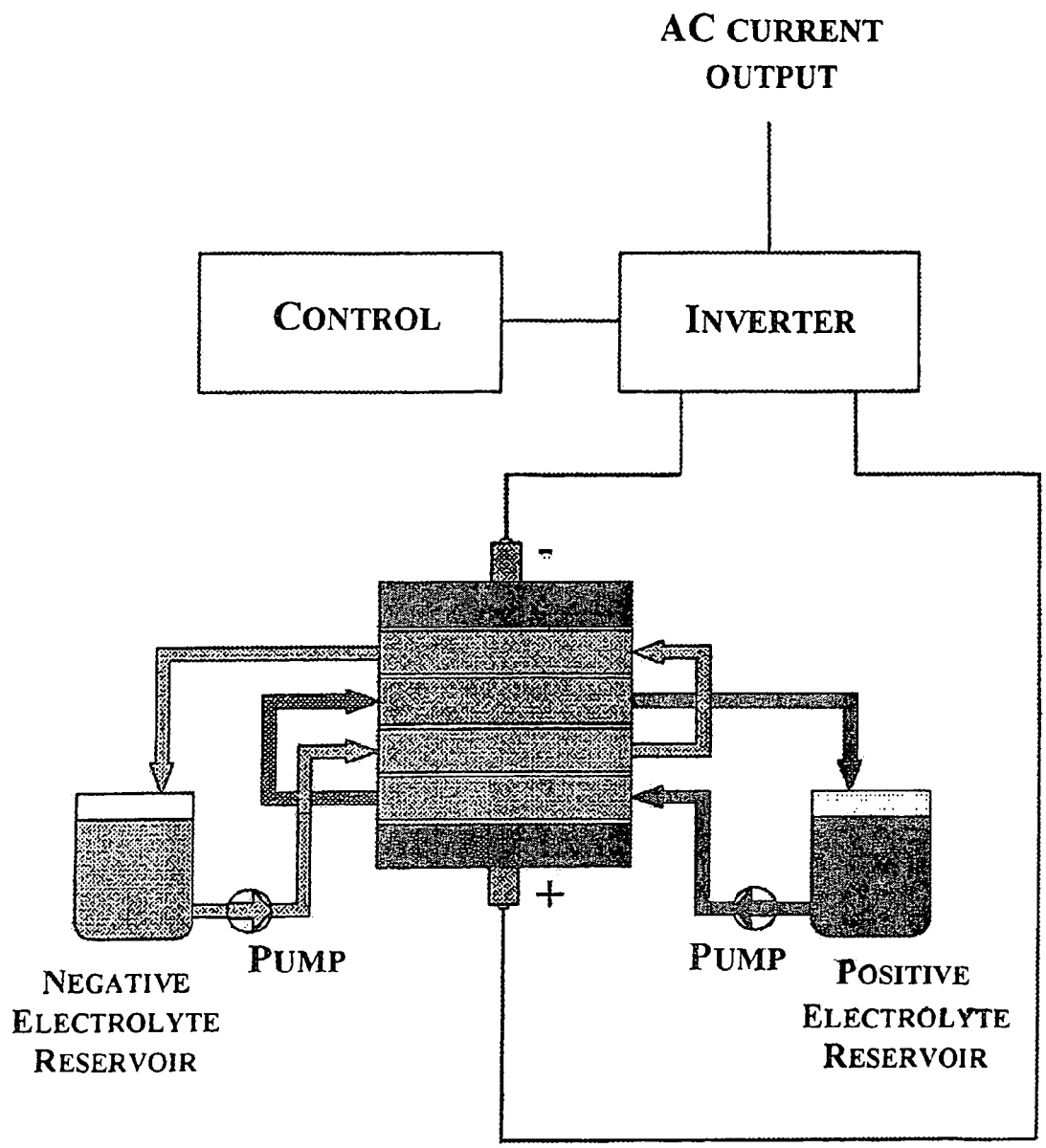
FIG. 1 is a diagram of a battery system employing an inverter for outputting an AC voltage of a pre-established value and frequency.
Figure 2:
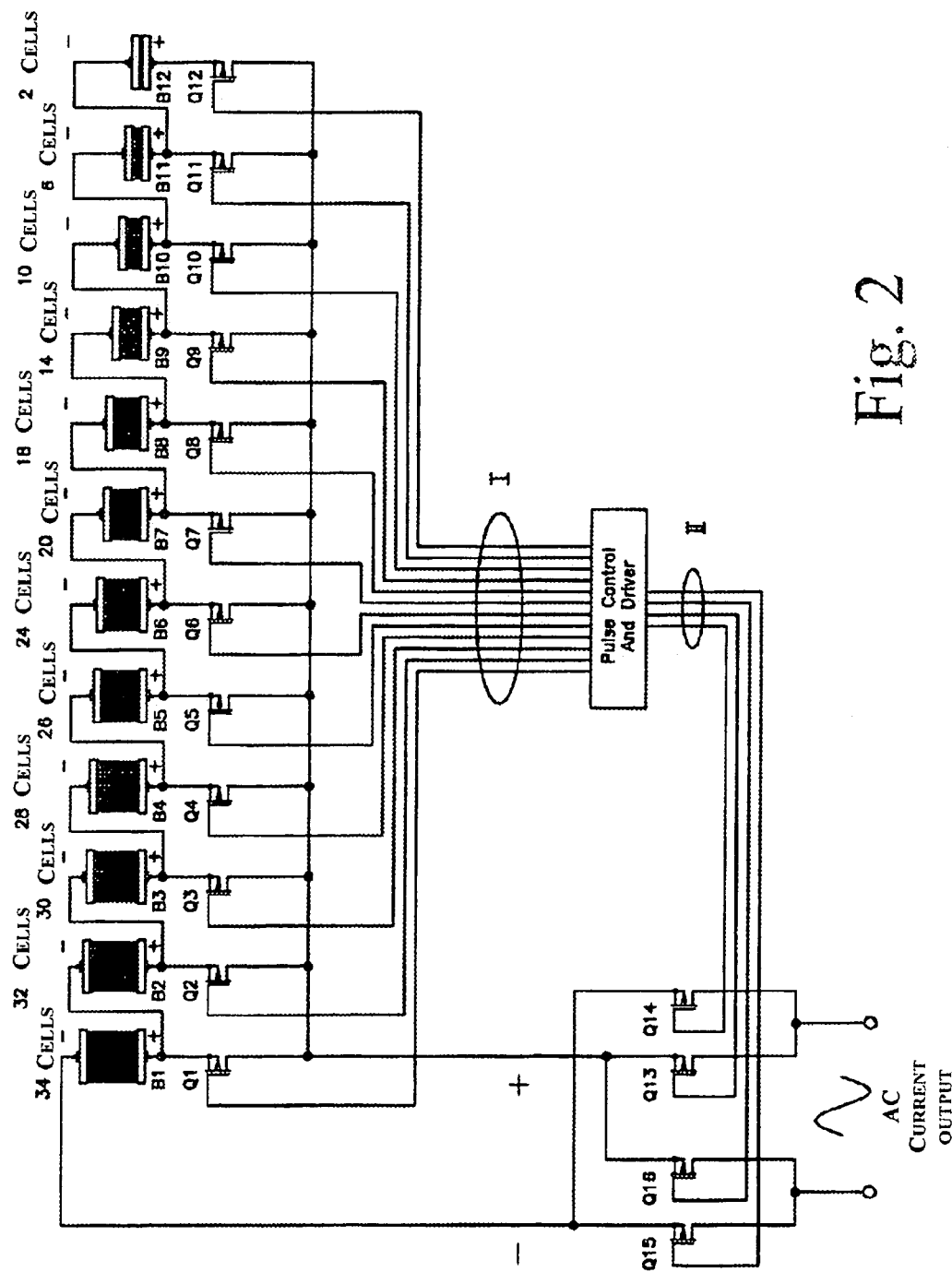
FIG. 2 is a basic diagram of an inverter of this invention.

Referring to FIG. 2, the different intermediate voltage taps of the chain of elementary cells in series are established by employing twelve (N=12) batteries, B1, B2, . . . B11, B12, each composed of a pre-determined number of elementary cells such to be proportionate to, for the considered example, the value of the trigonometric sine function in the first quadrant.

In the depicted example, the first battery is constituted by 34 cells, the second battery by 32 cells, the third by 30 and so forth to the twelfth cell that is composed by only 2 elementary cells.

To each intermediate tap of such an electric series of DC current sources of a certain voltage, thus corresponding to a battery voltage that varies according to the trigonometric sine function in the first quadrant (of course the number of cells is proportional to the voltage at the terminals of the respective battery) is associated a power switch Q1, Q2, Q3 . . . Q11 and Q12, connecting each intermediate tap and the terminal (+) of the last battery of the array of batteries to a common node of the circuit labeled with the symbol +.

The other terminal (−) of the first battery B1 of the array constitutes the circuit node identified by the symbol −.

Four power switches Q15, Q16, Q13 and Q14 form a classic output bridge stage coupled to the circuit nodes − and + and are the AC output.

A control and drive block PULSE CONTROL AND DRIVER has a first output bus I constituted by at least N wires, each connected to a control terminal of a respective power switch of the array of N power switches, Q1, Q2, . . . Q12, and a second bus II of at least four wires, respectively connected to the control terminals of the four power switches Q13, Q14, Q15 and Q16, constituting the output bridge stage that inverts the paths (polarity) of the output current.

Figure 3:
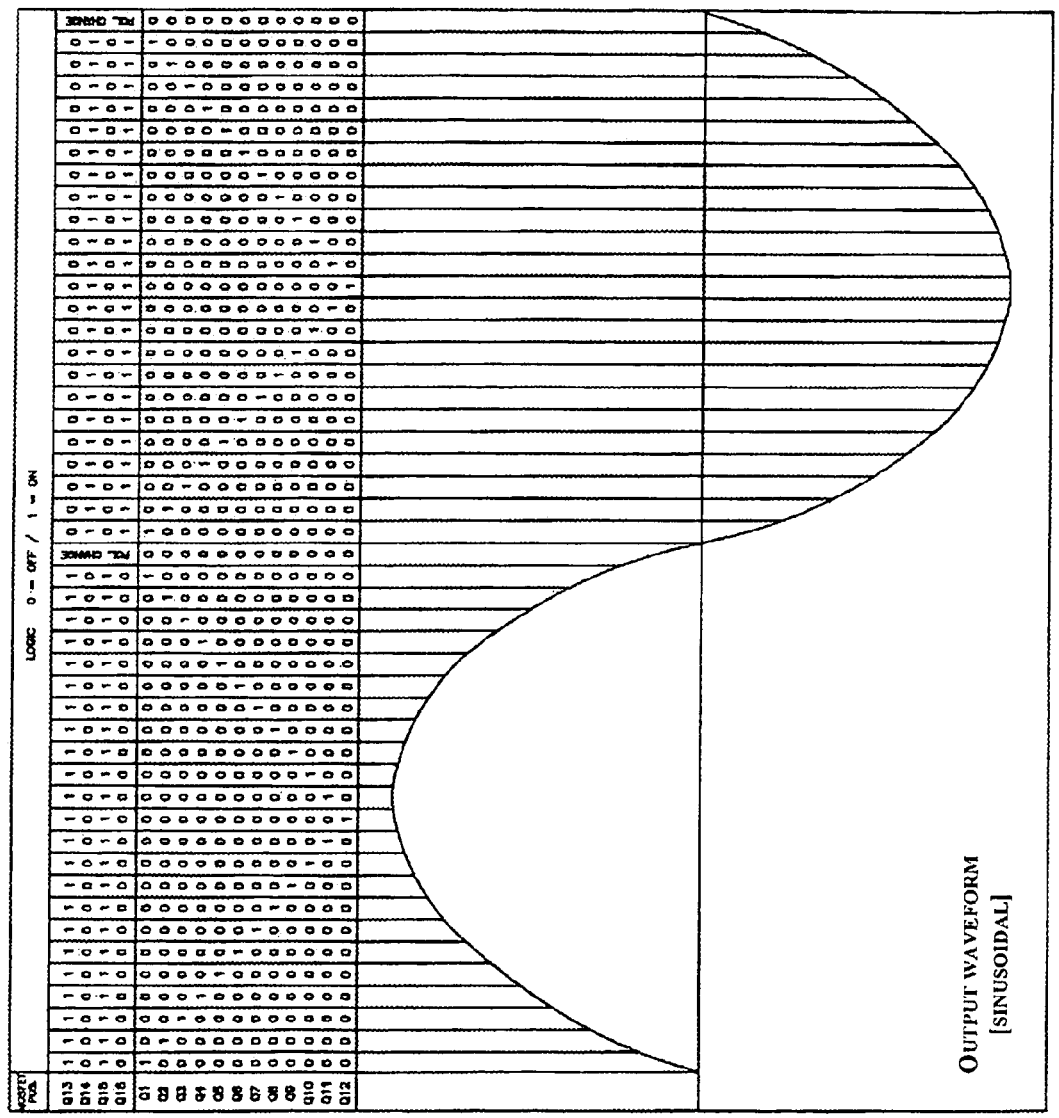
FIG. 3 illustrates in a graphic manner the functioning of the inverter of the invention.

The functioning of the inverter of the invention is graphically illustrated in FIG. 3. The table at the top shows the logic state of the twelve wires of the control bus I, i.e. the conduction state (1) or the quiescent state (0) of the twelve power switches Q1, Q2, Q3, . . . Q11, Q12, and the logic state of the four wires of the second bus II, i.e. the conduction state (1) or the quiescent state (0) of the four power switches Q13, Q 14, Q15, Q16 selects the current paths through the output bridge, for the twelve time intervals, i.e. for the twelve discretization phases of the sine function in a quadrant.

FIG. 3 is the idealized waveform, in the sense that at each phase switching of the twelve power switches, when the modulus of the output AC voltage is increasing, the elementary cells that are additively included in the output current circuit at each new phase switching take a certain time for developing their fill voltage.

In the case of vanadium redox flow batteries the order of magnitude of the time needed for reaching the steady-state voltage may be of few hundreds of microseconds, and even in the case of fuel cells this time lag remains within several hundreds of microseconds. In both cases the lag times are compatible with the functioning of the inverter of the invention for producing an AC output voltage at a frequency of 50 or of 60 Hz.

In practice, this lag time of the newly included cells produces a ripple at the clock frequency that may be perfectly tolerated by many kinds of electric loads or that may be easily filtered, if necessary. The eventual energy deficit due to the lag time of the newly included cells is accounted far by designing for a sufficient number of primary cells that are included in the output current circuit at each switching, in order to ensure a correct RMS value of the output AC voltage.

For each interval of discretization, in the lower part of FIG. 3, is shown the idealized waveform (ideally a sine wave) of the AC output voltage.

Of course, the N (in the considered example N=12) intermediate taps, that for the example considered are established such to correspond, during each switching interval, to the sine function of the desired peak voltage value, may also have a different organization of the number of elementary cells that are sequentially included in the circuit, from that depicted in FIG. 2.

Figure 4:
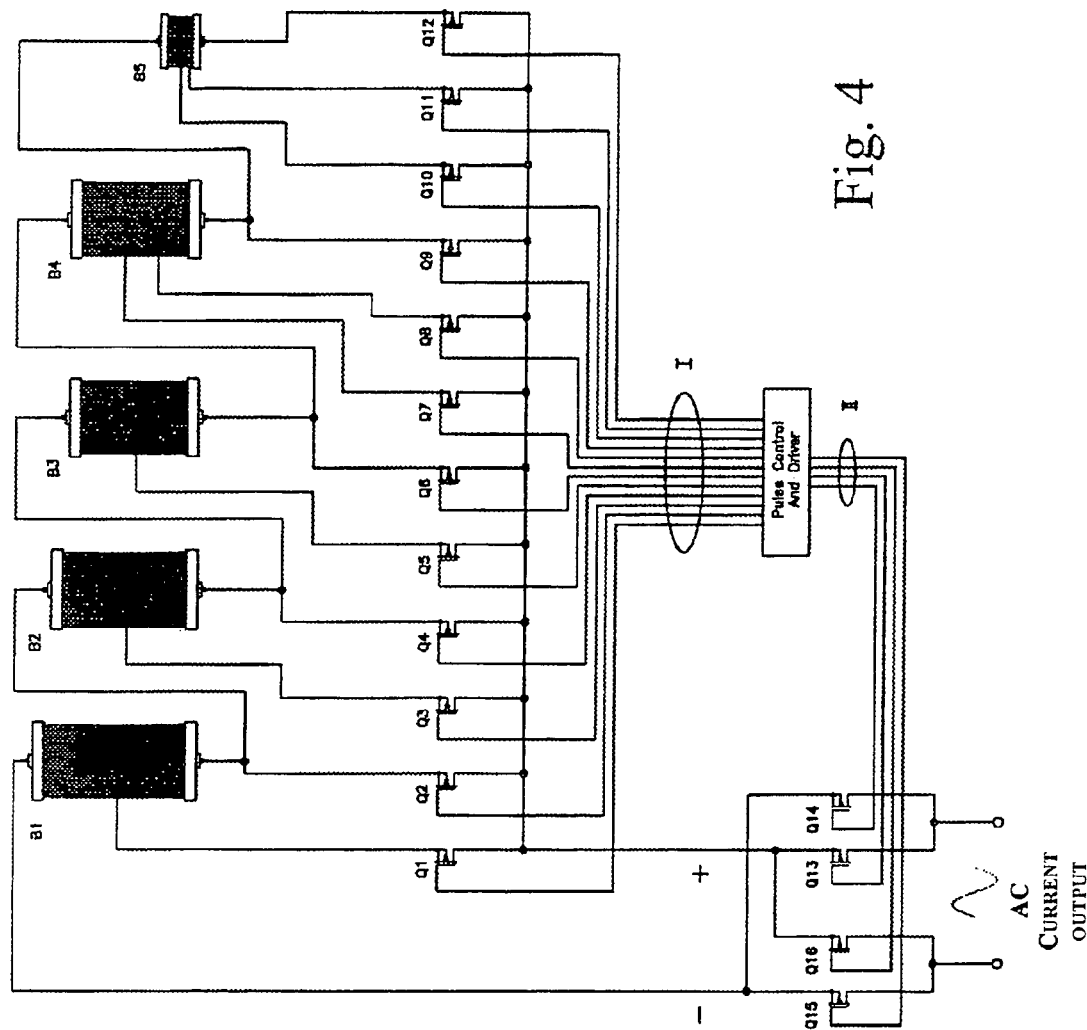
FIG. 4 is a basic diagram of an inverter of this invention with the intermediate taps organized in a different manner.

In FIG. 4 the intermediate taps are organized in a manner functionally equivalent to that of FIG. 2, by employing five multicell batteries B1, B2, B3, B4 and B5, each having one or more intermediate voltage taps such to permit to include selectively in the circuit a number of cells determined in function of the value of the design sine function in a quadrant.

As will be readily observed, the diagrams of FIG. 2 and of FIG. 4 implement the same scheme of discretization and are equivalent under any functional point of view.

Moreover, as will be easily recognized, the voltage taps and the relative activation sequence of the control wire of the respective power switches Q1, Q2, Q3, . . . for a discretization phase interval, may not necessarily follow a decreasing and increasing sequence according to the scanning direction of the N discretization phases of a quadrant of a sine function. The taps (multicell batteries) may be organized according to any "pattern" of sequential and cyclic selection of the N intermediate taps as long as a discretization of the alternated function, that in the considered example is a sinusoidal function (sine or cosine, their reciprocal functions or any sinusoidal function are substantially equivalent for the method of the present invention) is realized.

The circuit block PULSE CONTROL AND DRIVER is of immediate comprehension for any skilled person.

Besides containing as many output buffers as are the wires of the two output buses I and II, sized such to satisfy the driving requirements of the respective power switches 01, . . . Q16, as far as the logic and functional control of the power switches is concerned, the relative functions may be implemented either via software or via hardware.

According to a possible hardware solution, the block PULSE CONTROL AND DRIVER comprises a clock generator for discretizing the desired waveform, by timing the N phase switchings in each quadrant of the period of the established AC output frequency and, for example through one or more up-down counters, synchronizing the instant of switching the output current paths through the output bridge stage, i.e. of the polarity, at the end of each half a period.

Obviously, when the intermediate voltage taps are to be selected sequentially, as in the two alternative embodiments of FIG. 2 and FIG. 4, the control of the driving buffers of the N wires of the bus I may be realized in a very simple and effective manner by means of a shift register or equivalent circuit device.

Clearly, depending from the type of power switches being used, each driving buffer may integrate control circuits of the power device for preventing spurious switchings or to disable any switching when dangerous working conditions are detected, according to well known techniques.

It is also evident that, by providing for a sufficient number of intermediate voltage taps, it is even possible to program the nominal value of the desired AC output voltage by simply programming the sequence of selection of a certain number N of intermediate voltage taps suitably choosing among the taps available. This permits to modify the nominal AC output voltage as well as the AC frequency without requiring a transformer.

Even the output waveform may be programmed in a form deliberately different from a sinusoid.

It is worth remarking that the multicell battery B5 may be constituted by elementary cells of reduced area (that is by 4 to 5 times smaller than the area of the elementary cells of the battery B1) because it operates (in a discharge phase) for a relatively shorter time fraction (peak zone of the sine curve). Under a condition of operation whereby very short discharge intervals alternate to comparatively longer intervals of quiescence, a redox flow battery may tolerate overloads of to 4 or 5 times the rated power without any problem. As a matter of choice, the area of the elementary cells of the batteries may be varied in function of its relative "duty-cycle" during a discharging phase in the inverter of the invention.

Figure 5:
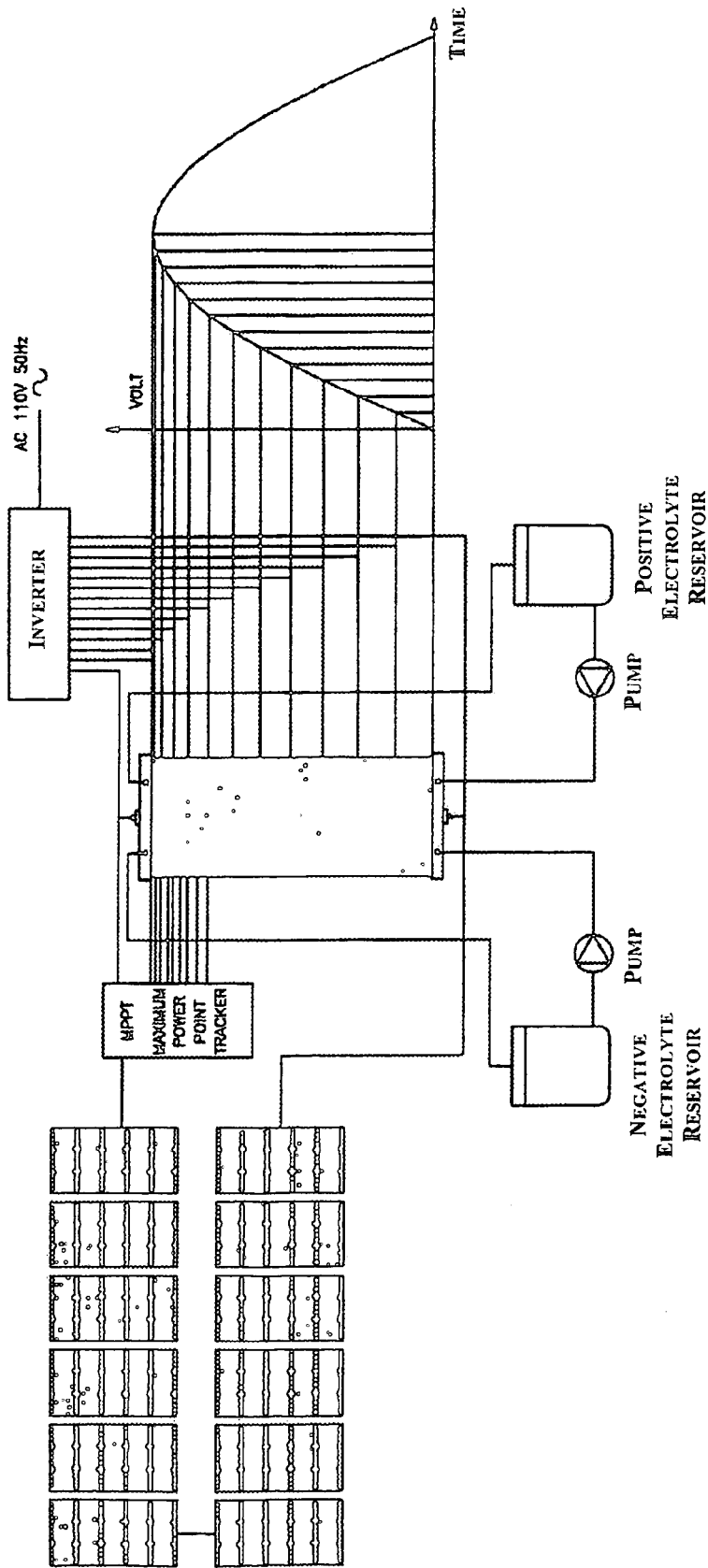
FIG. 5 is a basic diagram of a photovoltaic (solar) panel plant embodying the 15 present invention.
Figure 6A:
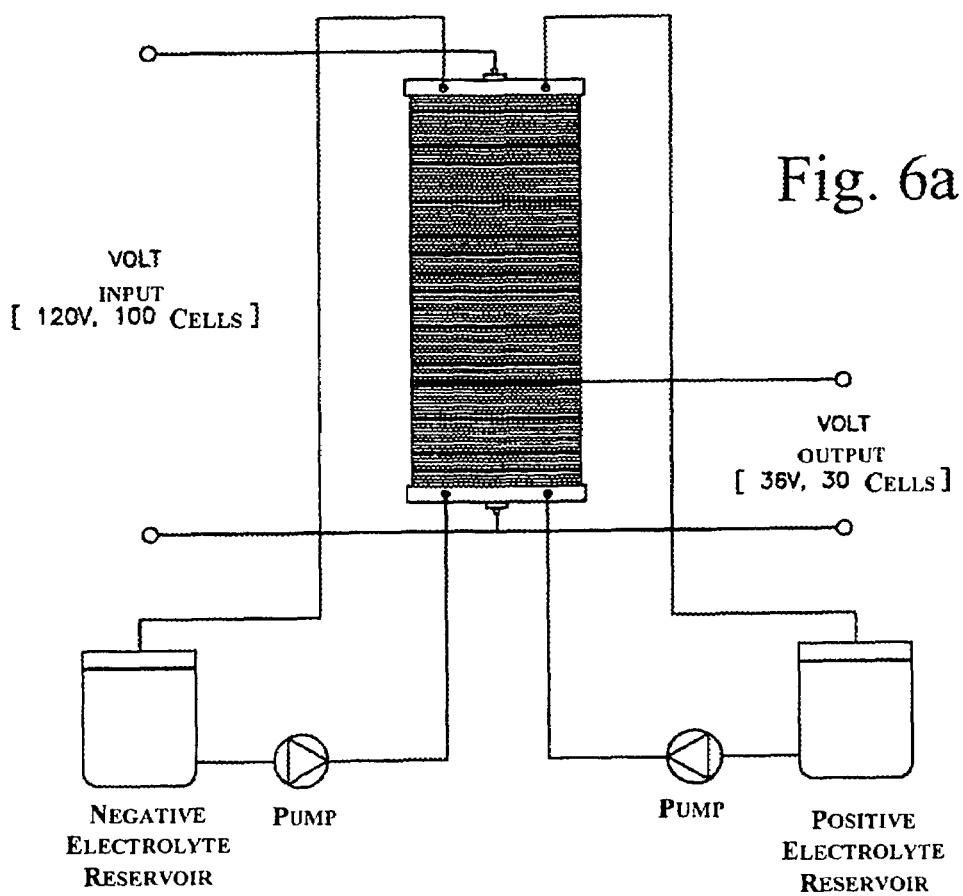
FIGS. 6*a* and 6*b* schematically compare a DC autotransformer in the form of a battery with an AC autotransformer.
Figure 6B:
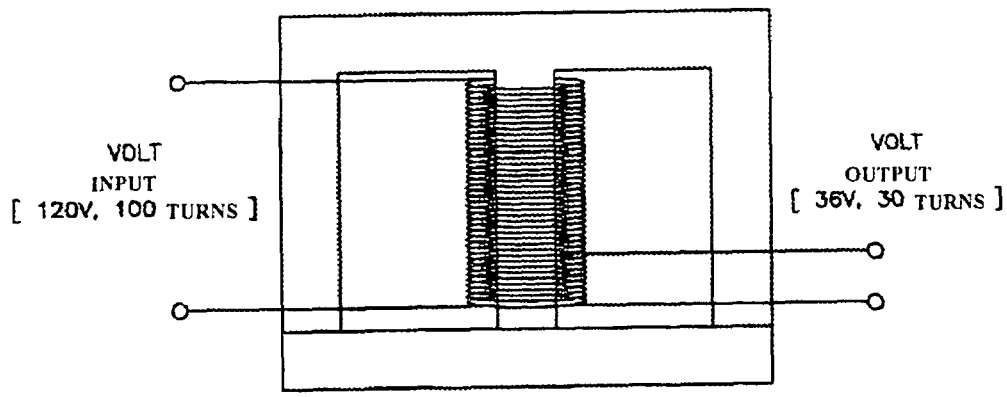

A photovoltaic (solar) panel plant realized according to the present invention is schematically depicted in FIG. 5.

For example, by using 12 standard panels each of a rated voltage of 12 Volts, it is possible to obtain a total rated voltage of 144 Volts by connecting them in series.

Using the various intermediate voltage taps of a redox flow battery of elementary cells (or of more multicell redox flow batteries in series) it is possible to maintain the counter voltage at a value closest to the point of the characteristic curve in the voltage-current domain that correspond to the maximum power can be extracted from the panels at any moment, in function of the irradiation conditions.

Moreover, from the same redox flow battery (or batteries in series), it is possible, using intermediate voltage taps and related power switches organized as described above, to construct directly a sinusoidal AC output voltage.

In this case, the generated AC voltage may theoretically have a peak value of about 144 Volts or slightly lower than that and an RMS value of about 110 Volts or slightly lower than that because of the above-discussed reasons.

In the figure is suggestively depicted by a diagram, the manner in which the sinusoidal output waveform with peak value of about 144 Volts may be constructed by the inverter of the invention.

Clearly, the intermediate voltage taps of the inverter could be established directly in the series of photovoltaic panels functioning as primary photovoltaic cells. In this case, a redox flow battery could be used as a voltage stabilizing buffer element and eventually for storing any energy in excess derived from solar irradiation.

Figure 7A:
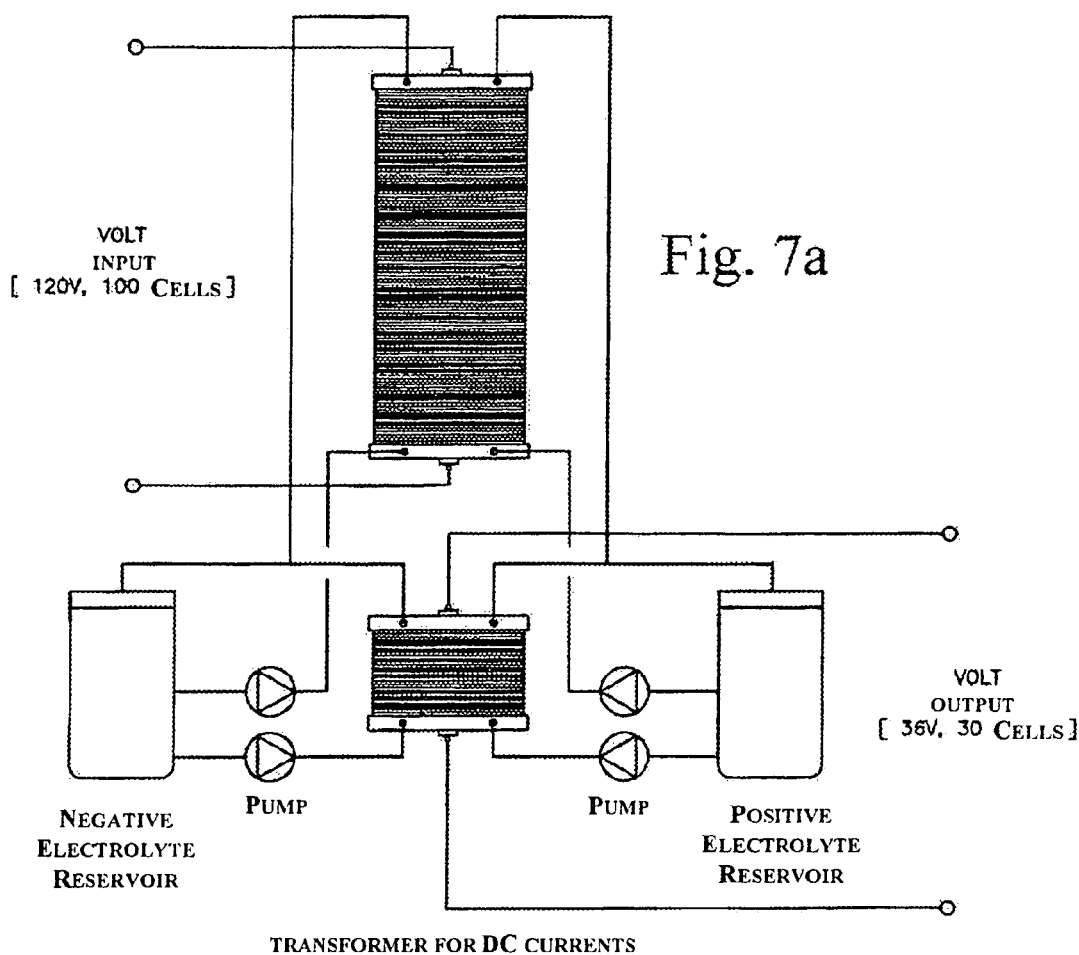
FIGS. 7*a* and 7*b* compare a DC transformer in the form of a battery with an AC transformer.
Figure 7B:
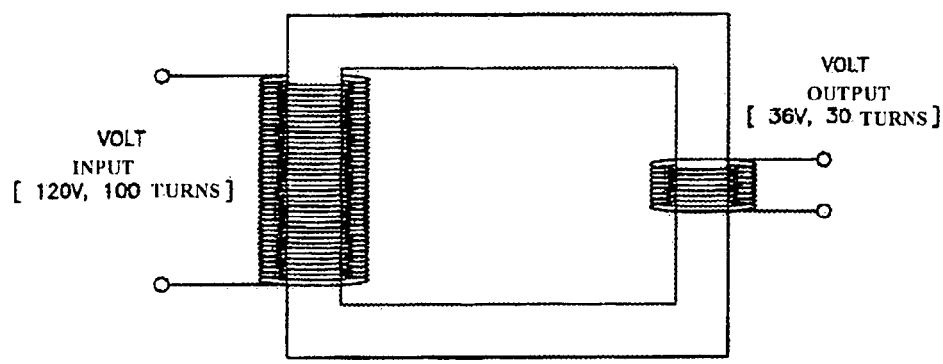

The two pairs of FIGS. 6a and 6b, 7a and 7b are suggestive schematic representations highlighting the analogies between an electric autotransformer (FIG. 6b) and a redox flow battery autotransformer (FIG. 6a) and between an electric transformer (FIG. 7b) and a redox flow battery transformer (FIG. 7a).

Notwithstanding the fact that for obvious reasons of simplicity, the invention has been illustrated for the case of monophase AC outputs, the system may be "triplicated" for constructing a three-phase AC output.

The invention claimed is:

1. A method for producing electric power at a certain AC voltage from at least one multicell battery of elementary DC source cells electrically connected in series, comprising:
    establishing a plurality of N intermediate voltage taps along the elementary DC source cells electrically connected in series such that a number of the elementary DC source cells between a certain intermediate tap and one of another adjacent intermediate tap and a terminal of the elementary DC source cells electrically connected in series is proportionate to an amplitude in a respective phase interval of a number N of discretization phases of an AC voltage waveform to be produced in a quadrant;
    providing a number N of power switches, each connecting a respective intermediate tap and a first terminal of the elementary DC source cells electrically connected in series to a common circuit node of a first polarity;
    coupling said common circuit node of first polarity and the other terminal of the elementary DC source cells electrically connected in series of polarity opposed to said first polarity, to respective nodes of an output bridge stage constituted by at least four power switches controlled in pairs, the other two nodes of the bridge stage constituting the AC voltage power output;
    switching sequentially and cyclically in a continuous manner one switch at a time of the N power switches, each for a time interval corresponding to 1/(4N) times a period of the AC output voltage and switching current paths through the bridge stage every half a period.

2. The method according to claim 1, wherein the number of elementary DC source cells that are included in a circuit by selecting a certain intermediate tap that corresponds to a respective value of a sine function in the respective phase interval of the N discretization phases in which each quadrant is subdivided.

3. The method according to claim 1, wherein said elementary DC source cells electrically connected in series belong to N multicell batteries each constituted by a number of elementary DC source cells electrically connected in series that varies according to said correspondence.

4. A static inverter for at least one multicell DC source battery of elementary DC source cells electrically connected in series and including a number N of intermediate voltage taps along the elementary DC source cells electrically connected in series, comprising:
    a number of elementary DC source cells between an intermediate tap and one of another adjacent intermediate tap and an end terminal of said number of elementary DC source cells is proportionate to an amplitude in a respective phase interval of a number N of discretization phases of a waveform of the AC voltage to be output in a quadrant; and comprising:
    a number N of power switches each connecting a respective intermediate tap and a first end terminal of a first polarity of said chain of elementary DC source cells electrically connected in series to a common circuit node of said first polarity;
    an output bridge stage constituted by at least four power switches controlled in pairs for switching current paths through the output bridge stage, having a first pair of nodes coupled to said common circuit node of said first plurality and to the other end terminal of polarity opposite to said first polarity of said elementary DC source cells electrically connected in series, respectively, and a second pair of nodes constituting an AC output;
    a control circuit sequentially and cyclically turning on, in a continuous manner, one switch at a time of said N power switches; each for a phase interval of 1/(4N) times a period of said AC output, and alternately turning on by pairs said at least four power switches of said output bridge stage at every half a period of said AC output.

5. The inverter according to claim 4, wherein the number of elementary DC source cells that are included in a circuit by selecting a certain intermediate voltage tap is proportionate to a value of a sine function in the respective phase interval of the N discretization phases in which each quadrant is subdivided.

6. The inverter according to claim 5, wherein said elementary DC source cells electrically connected in series belong to a plurality of multicell batteries, each constituted by a number of elementary DC source cells electrically connected in series that varies according to said correspondence.

7. The inverter according to claim 4, wherein said control circuit comprises at least N+4 driving buffers of respective wires of a first N-wire control bus of said N power switches and a second four-wires control bus of said at least four power switches of said output bridge stage.

8. The inverter according to claim 7, wherein said driving buffers are controlled via software.

9. The inverter according to claim 7, wherein said control circuit comprises:
    a clock generator for discretizing a desired waveform by timing the N phase switchings in each quadrant of a period of an established AC output frequency; and
    at least an up-down counter for synchronizing an instant of switching output current paths through the output bridge stage at the end of each half a period.

10. A system for powering electric loads at a certain AC voltage from a solar energy conversion system comprising:
    at least one photovoltaic panel;
    at least one redox flow battery for storing energy comprising a plurality of elementary DC source cells electrically connected in series and having a number N of intermediate voltage taps along a number of DC source cells composed of said elementary the elementary DC source cells electrically connected in series; and
    an inverter for outputting electric power at said AC voltage, wherein the number of elementary DC source cells comprised between an intermediate tap and another adjacent intermediate tap or an end terminal of elementary DC source cells electrically connected in series is proportionate to an amplitude in a respective phase interval of a number N of discretization phases of a waveform of the AC voltage to be output in a quadrant; and comprising a number N of power switches each connecting a respective intermediate tap and a first end terminal of a first polarity of said number of elementary DC source cells electrically connected in series to a common circuit node of said first polarity;

an output bridge stage constituted by at least four power switches controlled in pairs for switching current paths through the output bridge stage, having a first pair of nodes coupled to said common circuit node of said first polarity and to the other end terminal of polarity opposite to said first polarity of said chain of elementary DC source cells electrically connected in series, respectively, and a second pair of nodes constituting an AC output;

a control circuit sequentially and cyclically turning on, in a continuous manner, one switch at a time of said N power switches; each for a phase interval of $1/(4N)$ times the period of said AC output, and alternately turning on by pairs said at least four power switches of said output bridge stage at every half a period.

* * * * *